United States Patent [19]

Asahara

[11] 4,165,989

[45] Aug. 28, 1979

[54] FARADAY ROTATION GLASS

[75] Inventor: Yoshiyuki Asahara, Higashiyamato, Japan

[73] Assignee: Hoya Corporation, Tokyo, Japan

[21] Appl. No.: 889,571

[22] Filed: Mar. 23, 1978

[30] Foreign Application Priority Data

May 30, 1977 [JP] Japan ................... 52-62983

[51] Int. Cl.$^2$ .......................... C03C 3/16; C03C 3/14; G02B 1/00
[52] U.S. Cl. ............................... 106/47 Q; 106/47 R; 252/62.51
[58] Field of Search .......................... 106/47 Q, 47 R; 252/301.4 R, 301.4 P, 301.4 F, 62.51

[56] References Cited

U.S. PATENT DOCUMENTS

| 3,318,652 | 5/1967 | Berger et al. | 106/47 R |
| 4,075,120 | 2/1978 | Myers et al. | 106/47 Q |

FOREIGN PATENT DOCUMENTS 2304582 10/1976 France ...................................... 106/47 Q Primary Examiner—Helen M. McCarthy
Attorney, Agent, or Firm—Sughrue, Rothwell, Mion, Zinn and Macpeak

[57] ABSTRACT

A Faraday rotation glass having a composition, in mole%, of
$Tb_2O_3$: 5 to 25%
$P_2O_5$: 55 to 75%
$B_2O_3$: 5 to 25%
$Al_2O_3$: 0 to 15%
$K_2O+MgO$: 5 to 25%
$K_2O$: 0 to 25%, and
$MgO$: 0 to 15%

1 Claim, No Drawings

FARADAY ROTATION GLASS

BACKGROUND OF THE INVENTION

1. Field of the Invention

This invention relates to a Faraday rotation glass having a large Verdet constant and a small nonlinear optical constant.

2. Description of the Prior Art

The rotation of the plane of polarization of a beam of linearly polarized light when the light passes through a transparent material in a magnetic field is known as the Faraday effect. The angle $\theta$ of the rotation is given by the following equation $$\theta = VHl$$

where $\theta$ is the angle of rotation measured in minutes, H is the strength of the magnetic field in gausses, l is the length of the light path in the material through which the light passes in centimeters, and V is the Verdet constant inherent to the substance.

This phenomenon is utilized, for example, in a light isolator which permits the transmission of light only in one direction. In this case, it is important for the Verdet constant of the material to be large. It is known that a glass containing large quantities of paramagnetic rare earth element oxides has a large Verdet constant, and in particular, since terbium oxide ($Tb_2O_3$) does not have an inherent absorption in the visible and infrared regions, terbium oxide is an effective ingredient of a Faraday rotation glass.

When a Faraday rotation glass is used as a light isolator element in a large-output nuclear fusion laser optical system, the glass needs to have a low nonlinear optical constant $n_2$ (namely, a low refractive index) in addition to having a large Verdet constant. This is because a glass with a lower $n_2$ causes lesser self-focusing of laser beams, and therefore is less subject to damage by the self-focusing effect.

In a glass containing $Tb^{3+}$ ion, the Verdet constant increases as the content of $Tb^{3+}$ ion increases. At the same time, the refractive index of the glass increases and so does $n_2$. Hence, in order to obtain a glass having a large Verdet constant and a small nonlinear optical constant $n_2$, a glass having a low refractive index which can contain a large quantity of a $Tb^{3+}$ ion must be used. From this standpoint, Tb-phosphate glasses are preferred to Tb-borosilicate glasses.

SUMMARY OF THE INVENTION

The present invention is based on the discovery that by adding $K_2O$ and/or $MgO$ to a Tb-phosphate glass having a low refractive index, a Faraday rotation glass having an even lower refractive index can be obtained. Generally, Tb-phosphate glasses containing alkali metal or alkaline earth metal oxides are unstable, but in the present invention such glasses are stabilized by incorporating $B_2O_3$ into the glass.

According to the present invention, there is provided a Faraday rotation glass having a composition, in mole%, of
$Tb_2O_3$: 5 to 25%
$P_2O_5$: 55 to 75%
$B_2O_3$: 5 to 25%
$Al_2O_3$: 0 to 15%
$K_2O + MgO$: 5 to 25%
$K_2O$: 0 to 25% and
$MgO$: 0 to 15%

DETAILED DESCRIPTION OF THE INVENTION

The characteristic features of the invention are described in more detail by reference to specific examples of glasses of this invention given in the following tables.

Table 1

| Glass No. | Composition (mole %) | | | | | | Verdet Constant (min/oe-cm) |
|---|---|---|---|---|---|---|---|
| | $P_2O_5$ | $B_2O_3$ | $Tb_2O_3$ | $K_2O$ | $Al_2O_3$ | $MgO$ | |
| 1 | 75 | 10 | 5 | 10 | — | — | −0.042 |
| 2 | 70 | 10 | 10 | 10 | — | — | −0.081 |
| 3 | 65 | 10 | 15 | 10 | — | — | −0.120 |
| 4 | 55 | 10 | 25 | 10 | — | — | −0.188 |
| 5 | 75 | 10 | 10 | 5 | — | — | −0.088 |
| 6 | 65 | 10 | 10 | 15 | — | — | −0.082 |
| 7 | 55 | 10 | 10 | 25 | — | 13 | −0.086 |
| 8 | 75 | 5 | 10 | 10 | — | — | −0.081 |
| 9 | 65 | 15 | 10 | 10 | — | — | −0.085 |
| 10 | 55 | 25 | 10 | 10 | — | — | −0.089 |
| 11 | 65 | 10 | 8 | 10 | 7 | — | −0.067 |
| 12 | 70 | 10 | 10 | 5 | — | 5 | −0.084 |
| 13 | 70 | 10 | 10 | — | — | 10 | −0.085 |
| 14 | 65 | 10 | 10 | — | — | 15 | −0.090 |
| 15 | 60 | 10 | 13 | 10 | 2 | — | −0.103 |
| 16 | 66 | 8 | 12 | 13 | 1 | — | −0.100 |
| 17 | 60 | 10 | 5 | 10 | 15 | — | −0.040 |

Table 2

| Glass No. | Composition (mole %) | | | | | | |
|---|---|---|---|---|---|---|---|
| | $P_2O_5$ | $B_2O_3$ | $Tb_2O_3$ | $K_2O$ | $Al_2O_3$ | $MgO$ | $Na_2O$ |
| Example | | | | | | | |
| 3 | 65 | 10 | 15 | 10 | — | — | — |
| 18 | 68 | 5 | 15 | 5 | 2 | 5 | — |
| 19 | 65 | 10 | 15 | — | — | 10 | — |
| Reference Example | | | | | | | |
| 20 | 65 | 10 | 15 | — | — | — | 10 |
| 21 | 65 | 10 | 15 | — | — | — | — |
| 22 | 65 | 10 | 15 | — | — | — | — |
| 23 | 65 | 10 | 15 | — | — | — | — |
| 24 | 68 | 5 | 15 | — | 2 | — | 6 |

| Glass No. | Composition (mole %) | | | Refractive Index (nd) |
|---|---|---|---|---|
| | CaO | SrO | BaO | |
| Example | | | | |
| 3 | — | — | — | 1.544 |
| 18 | — | — | — | 1.543 |
| 19 | — | — | — | 1.546 |

Table 2-continued

| Reference Example | | | | |
|---|---|---|---|---|
| 20 | — | — | — | 1.555 |
| 21 | 10 | — | — | 1.555 |
| 22 | — | 10 | — | 1.559 |
| 23 | — | — | 10 | 1.583 |
| 24 | 4 | — | — | 1.550 |

In the present invention, $Tb_2O_3$, as a paramagnetic oxide, is essential for increasing the Verdet constant of the glass, and the Verdet constant increases as the proportion of $Tb_2O_3$ increases. If, however, the proportion of $Tb_2O_3$ exceeds 25 mole%, the resulting glass becomes extremely unstable, and a satisfactory vitreous condition cannot be obtained. If the proportion of $Tb_2O_3$ is less than 5%, the Verdet constant of the resulting glass is low, and the glass has no advantage over the Verdet constant of a diamagnetic lead glass.

$B_2O_3$ is an essential component for stabilizing glasses containing $K_2O$ or $MgO$. At least 5 mole% of $B_2O_3$ is required. If the amount of $B_2O_3$ exceeds 25 mol%, undissolved matter precipitates in the glass, and the resulting glass is useless as a Faraday rotation glass.

$K_2O$ and/or $MgO$ is an essential component for reducing the refractive index of the glass. As can be seen from Table 2 above, the refractive index of the glass containing this component is lower than the refractive index of glasses containing other alkali metal or alkaline earth metal oxides (for example, this can be seen from a comparison of Glass Nos. 3 and 19 of the invention with glasses in Reference Examples 20, 21, 22 and 23 having the same $Tb_2O_3$ content, and a comparison of Glass No. 18 with the glass of Reference Example 24). Accordingly, the amount of $K_2O$ and/or $MgO$ needs to be at least 5 mole%. If the amount of $K_2O$ exceeds 25 mole%, the resulting product is not a glass, and if the amount of $MgO$ exceeds 15 mole%, the composition cannot be vitrified. Furthermore, if the total amount of $K_2O$ and $MgO$ exceeds 25 mole%, the glass becomes unstable.

$Al_2O_3$ is a component which increases the viscosity of the glass and stabilizes the glass. If $Al_2O_3$ is present in the glass in an amount of more than 15 mole%, the viscosity of the glass becomes extremely high, and the glass is difficult to melt.

$P_2O_5$ is an essential component as a glass network-forming oxide for making the glass. If the amount of $P_2O_5$ is less than 55 mol%, a glass cannot be formed, and if the amount of $P_2O_5$ exceeds 75 mole%, the amounts of the other essential components, i.e., $Tb_2O_3$, $K_2O$ and/or $MgO$ for reducing the refractive index, and $B_2O_3$ for stabilizing glass, etc. decrease relatively, and the advantages of the invention cannot be achieved.

The glass of this invention can be produced by forming a batch which will provide a glass composition, in mole%, of 5 to 25% $Tb_2O_3$, 55 to 75% $P_2O_5$, 5 to 25% $B_2O_3$, 0 to 15% $Al_2O_3$, 5 to 25% $K_2O+MgO$, 0 to 25% $K_2O$, and 0 to 15% $MgO$, and melting the batch in a platinum melter at about 1300° to 1400° C.

While the invention has been described in detail and with reference to specific embodiments thereof, it will be apparent to one skilled in the art that various changes and modifications can be made therein without departing from the spirit and scope thereof.

What is claimed is:

1. A Faraday rotation glass having a large Verdet constant and a small non-linear optical constant, which Faraday rotation glass consists essentially of, in mole%, of $Tb_2O_3$: 5 to 25%
$P_2O_5$: 55 to 75%
$B_2O_3$: 5 to 25%
$Al_2O_3$: 0 to 15%
$K_2O+MgO$: 5 to 25%
$K_2O$: 0 to 25%, and
$MgO$: 0 to 15%.

* * * * *